(12) United States Patent
Kee et al.

(10) Patent No.: US 11,445,351 B2
(45) Date of Patent: Sep. 13, 2022

(54) SYSTEM AND METHOD FOR KEYWORD GENERATION AND DISTRIBUTION FOR USE IN ACCESSING A COMMUNICATIONS DEVICE IN EMERGENCY MODE

(71) Applicant: MOTOROLA SOLUTIONS, INC., Chicago, IL (US)

(72) Inventors: Chew Yee Kee, Bayan Lepas (MY); Mun Yew Tham, Bayan Lepas (MY); Kah Jing Lee, Kulim (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 45 days.

(21) Appl. No.: 17/020,894

(22) Filed: Sep. 15, 2020

(65) Prior Publication Data
US 2022/0086615 A1 Mar. 17, 2022

(51) Int. Cl.
H04W 4/90 (2018.01)
G06F 40/279 (2020.01)
H04W 4/06 (2009.01)

(52) U.S. Cl.
CPC ............ *H04W 4/90* (2018.02); *G06F 40/279* (2020.01); *H04W 4/06* (2013.01)

(58) Field of Classification Search
CPC ....... H04W 4/90; H04W 4/06; H04W 76/007; H04W 4/22; H04W 64/00
See application file for complete search history.

(56) References Cited

U.S. PATENT DOCUMENTS

| 9,368,105 B1 | 6/2016 | Freed et al. |
| 10,217,453 B2 | 2/2019 | Stevans et al. |
| 2018/0211509 A1* | 7/2018 | Ramaci ................. A61J 7/0454 |
| 2019/0082304 A1* | 3/2019 | Bestor ............... G06F 16/90332 |
| 2019/0206230 A1* | 7/2019 | Musumano ........... H04L 67/327 |
| 2019/0327597 A1* | 10/2019 | Katz ....................... H04W 4/50 |
| 2019/0341033 A1* | 11/2019 | Hammons .............. G06N 3/006 |
| 2019/0378024 A1 | 12/2019 | Singh et al. |
| 2021/0105619 A1* | 4/2021 | Kashani ............. G06K 9/00832 |

FOREIGN PATENT DOCUMENTS

| EP | 3220265 A2 | 9/2017 |
| JP | 2009070180 A | 4/2009 |
| JP | H06585319 B1 | 10/2019 |

(Continued)

OTHER PUBLICATIONS

Regan, Sean, et al.: "Dynamically Assigning Wake Words", U.S. Appl. No. 16/817,445, filed Mar. 12, 2020, all pages.

(Continued)

*Primary Examiner* — Charles N Appiah
*Assistant Examiner* — Frank E Donado

(57) ABSTRACT

Techniques for keyword generation and distribution for use in accessing a communications device in emergency mode are provided. A communications device may determine an emergency mode has been entered. A keyword associated with a virtual assistant associated with the communications device may be generated. The keyword may be broadcast on a talkgroup associated with the communications device, wherein the keyword may be used by members of the talkgroup to access the virtual assistant associated with the communications device.

14 Claims, 5 Drawing Sheets

(56) References Cited

FOREIGN PATENT DOCUMENTS

| WO | 2010140907 A1 | 12/2010 |
| WO | 2018093278 A1 | 5/2018 |
| WO | 2018112445 A1 | 6/2018 |

OTHER PUBLICATIONS

Centralized Lone Worker, Ensure the Wellbeing of Lone Workers, Teldio, https://www.mototrbo.co.uk/portfolio/lone-worker-alarm/, Motorola Solutions 2020, downloaded from the internet: Sep. 1, 2020, all pages.

MOTOTRBO—MOTOTRBO Lone Worker Alarm, MOTOTRBO App, https://www.motorolasolutions.com/en_us/application-catalog/centralized-lone-worker.html#benefits, downloaded from internet: Sep. 1, 2020, all pages.

* cited by examiner

SYSTEM AND METHOD FOR KEYWORD GENERATION AND DISTRIBUTION FOR USE IN ACCESSING A COMMUNICATIONS DEVICE IN EMERGENCY MODE

BACKGROUND

One of the most dangerous situations for a worker is when they are working by themselves (e.g. lone worker). One example of lone workers may include public safety officers, such as police officers, who patrol by themselves. Other examples can include anyone who works by themselves without coworkers in the immediate vicinity. For example, in the utilities and oil and gas productions industries, workers may be tens or hundreds of miles away from coworkers. Further exacerbating the risk is the fact that lone workers may often work in hazardous environments.

For example, lone workers may perform maintenance activities in high risk environments, such as oil and gas production, utilities, mining, and chemical processing industries, where an accident can have serious consequences, up to and including fatal consequences. The fact that such an accident may occur while the worker is alone means that no one may even be aware that the worker is experiencing some kind of emergency.

In an attempt to make lone worker operation safer, portable two-way radio (e.g. walkie talkie) manufacturers developed a lone worker mode. Once the lone worker mode is activated, the worker may be periodically (e.g. every 5 minutes, etc.) prompted to provide an indication that the worker is still ok. For example, the worker may be prompted to press a button on his radio to indicate all is well. If the lone worker does not respond to the prompt, for example because an accident has occurred and the worker is injured/unconscious, an alert is raised, and the radio enters into an emergency mode. In some cases, the radio may provide its current location via (e.g. via global positioning system). Otherwise, a last known position of the worker may be used. Other personnel may be instructed to go to the location of the non-responding lone worker to determine if an emergency situation is actually occurring. Because of the lone worker feature, help can be automatically summoned even if the worker cannot do it themselves.

BRIEF DESCRIPTION OF THE SEVERAL VIEWS OF THE DRAWINGS

In the accompanying figures similar or the same reference numerals may be repeated to indicate corresponding or analogous elements. These figures, together with the detailed description, below are incorporated in and form part of the specification and serve to further illustrate various embodiments of concepts that include the claimed invention, and to explain various principles and advantages of those embodiments

Figure 1:
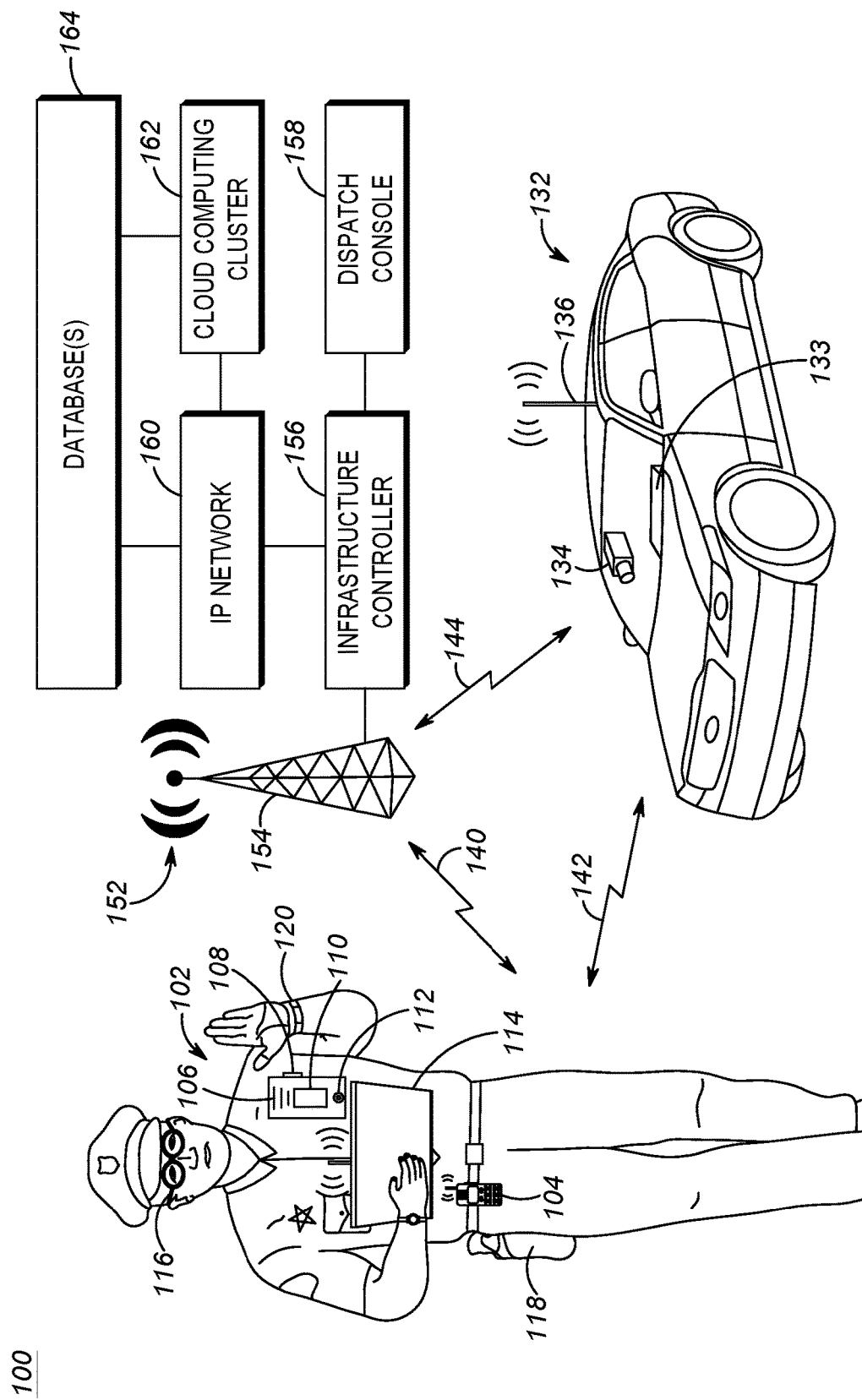
FIG. 1 is a system diagram illustrating a system for operating an electronic digital assistant, in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Although the lone worker feature is very helpful in summoning help for a worker who cannot call for help themselves, it raises additional problems. The lone worker that was experiencing an emergency may have succumbed to some environmental factor that made the environment dangerous and was the underlying cause as to why the lone worker was experiencing distress. For example, consider a lone worker in a chemical plant performing maintenance activities in an area with a gas leak that caused the worker to become unconscious. The lone worker feature may allow for assistance to be summoned, but without any knowledge of the environment, the rescuers may rush into the area and then become incapacitated themselves. In other words, the rescuers themselves will be in need of rescue.

The techniques described herein overcome these problems individually and collectively. A lone workers radio may be associated with a virtual assistant. When the lone workers radio goes into an emergency mode, a keyword associated with the virtual assistant associated with the radio may be generated and may be used by others to access the virtual assistant associated with the radio in emergency mode. The keyword may be broadcast on a talkgroup associated with personnel who may be responding to the emergency situation.

Those personnel may access the virtual assistant of the radio that has entered the emergency mode by using the generated keyword. Responding personnel may query the virtual assistant to access any available data related to the emergency situation. For example, the radio may be equipped with, or coupled to, various environmental sensors (e.g. gas sensors, heat sensors, etc.) or other types of sensors (e.g. movement sensors, proximity sensors, man down sensors, etc.). Responding personnel may query the virtual assistant to obtain data related to those sensors or any other information available to the virtual assistant associated with the radio in emergency mode.

Responding personnel may use this information to assess the environment in which a rescue may be necessary prior to actually having to enter the area. Because the virtual assistant associated with the radio broadcasts the keyword used for access at the time of emergency, responding personnel do not need to keep track of the keywords prior to an incident occurring. Furthermore, since the keyword need not be generated until an actual emergency has occurred, security of the virtual assistant is improved, as others cannot query the virtual assistant unless the radio associated with the virtual assistant is in an emergency mode.

Further advantages and features consistent with this disclosure will be set forth in the following detailed description, with reference to the figures.

A method is provided. The method includes determining that a communications device has entered an emergency mode. The method further includes generating a keyword associated with a virtual assistant associated with the communications device. The method also includes broadcasting the keyword on a talkgroup associated with the communications device, wherein the keyword may be used by members of the talkgroup to access the virtual assistant associated with the communications device.

In one aspect, the method includes determining the communications device has exited the emergency mode and disabling the keyword. In one aspect, the method includes receiving, via the talkgroup, a virtual assist query directed to the virtual assistant associated with the communications device, the virtual assistant query including the keyword and providing a response to the virtual assistant query on the talkgroup. In one aspect, the method includes detecting the keyword using natural language processing on the communications device.

In one aspect, the method includes detecting the keyword using natural language processing in a cloud computing environment. In one aspect, providing the response to the virtual assistant query further includes retrieving data responsive to the virtual assistant query from the communications device. In one aspect, providing the response to the virtual assistant query further includes retrieving data responsive to the virtual assistant query from sensors communicatively coupled to the communications device. In one aspect, the method further includes synchronizing a database to a cloud computing system in response to determining the communications device has entered an emergency mode, the database including data responsive to the virtual assistant query, wherein data in the database originates with at least one of the communications device and sensors communicatively coupled to the communications device.

A system is provided. The system includes a processor and a memory coupled to the processor. The memory contains a set of instructions thereon that when executed by the processor cause the processor to determine a communications device has entered an emergency mode, generate a keyword associated with a virtual assistant associated with the communications device, and broadcast the keyword on a talkgroup associated with the communications device, wherein the keyword may be used by members of the talkgroup to access the virtual assistant associated with the communications device.

In one aspect, the memory includes instructions to receive, via the talkgroup, a virtual assist query directed to the virtual assistant associated with the communications device, the virtual assistant query including the keyword, and provide a response to the virtual assistant query on the talkgroup. In one aspect, the memory includes instructions to detect the keyword using natural language processing on the communications device. In one aspect, the memory includes instructions to detect the keyword using natural language processing in a cloud computing environment.

In one aspect, the instructions to provide the response to the virtual assistant query further comprises instructions to retrieve data responsive to the virtual assistant query from the communications device. In one aspect, the instructions to provide the response to the virtual assistant query further comprises instructions to retrieve data responsive to the virtual assistant query from sensors communicatively coupled to the communications device. In one aspect, the memory includes instructions to synchronize a database to a cloud computing system in response to determining the communications device has entered an emergency mode, the database including data responsive to the virtual assistant query, wherein data in the database originates with at least one of the communications device and sensors communicatively coupled to the communications device.

A non-transitory processor readable medium containing a set of instructions thereon is provided. The instructions, when executed, cause the processor to determine a communications device has entered an emergency mode, generate a keyword associated with a virtual assistant associated with the communications device, and broadcast the keyword on a talkgroup associated with the communications device, wherein the keyword may be used by members of the talkgroup to access the virtual assistant associated with the communications device.

In one aspect the medium further includes instructions to receive, via the talkgroup, a virtual assist query directed to the virtual assistant associated with the communications device, the virtual assistant query including the keyword and provide a response to the virtual assistant query on the talkgroup. In one aspect the medium further includes instructions to detect the keyword using natural language processing on the communications device.

In one aspect, the instructions to provide the response to the virtual assistant query further includes instructions to retrieve data responsive to the virtual assistant query from the communications device. In one aspect, the instructions to provide the response to the virtual assistant query further comprises instructions to retrieve data responsive to the virtual assistant query from sensors communicatively coupled to the communications device.

Each of the above-mentioned embodiments will be discussed in more detail below, starting with example communication system and device architectures of the system in which the embodiments may be practiced, followed by an illustration of processing steps for achieving the method, device, and system for an electronic digital assistant. Further advantages and features consistent with this disclosure will be set forth in the following detailed description, with reference to the figures.

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners" or "virtual assistants") that may provide the user thereof with valuable information in an automated (e.g., without further user input) or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Siri provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, warning users of nearby dangers such as traffic accidents or environmental hazards, and providing many other types of information in a reactive or proactive manner.

A user may awaken the associated digital assistant using a wake word (e.g. "ok, Google" etc.) and then provide a query, which can be referred to as a query intent. For example, a query intent may be "What is the weather today?" The digital assistant may then access one or more databases in order to answer the query intent. Using a common wake word is feasible when only a single virtual assistant is able to hear the wake word. However, in the case of a shared channel, such as a talkgroup, with many users having a virtual assistant associated with their radios, a common wake word is not feasible, as every virtual assistant that hears the wake word would not be able to determine if the query was directed to it or not.

In the case of a shared channel communication, a wake work may be replaced by a keyword. The keyword may be associated with a virtual assistant that is associated with a specific radio. In other words, each radio may be listening for a keyword that is unique to the virtual assistant associated with that radio only. As such, there is no confusion as to which virtual assistant is being addressed, as each virtual assistant is not listening for the same word(s).

1. Communication System and Device Structures a. Communication System Structure

Referring now to the drawings, and in particular FIG. 1, a communication system diagram illustrates a system 100 of devices including a first set of devices that a user 102 (illustrated in FIG. 1 as a first responder police officer) may wear, such as a primary battery-powered portable radio 104 used for narrowband and/or broadband direct-mode or infrastructure communications, a battery-powered radio speaker microphone (RSM) video capture device 106, a laptop 114 having an integrated video camera and used for data applications such as incident support applications, smart glasses 116 (e.g., which may be virtual reality, augmented reality, or mixed reality glasses), sensor-enabled holster 118, and/or biometric sensor wristband 120. Although FIG. 1 illustrates only a single user 102 with a respective first set of devices, in other embodiments, the single user 102 may include additional sets of same or similar devices, and additional users may be present with respective additional sets of same or similar devices (wherein the single user 102 and the additional users may form a talkgroup of related users).

Although user 102 is described as a police officer, it should be understood that this is simply for purposes of explanation. The user 102 could be any person equipped with a portable radio. For example, the user 102 could be a lone worker in any industry. The description of user 102 is not limited to law enforcement users.

System 100 may also include a vehicle 132 associated with the user 102 having an integrated mobile communication device 133, an associated vehicular video camera 134, and a coupled vehicular transceiver 136. Although FIG. 1 illustrates only a single vehicle 132 with a single mobile communication device 133, respective single vehicular video camera 134 and/or microphone, single coupled vehicular transceiver 136, and single speaker, in other embodiments, the vehicle 132 may include additional same or similar mobile communication devices, video cameras, microphones, speakers, and/or transceivers, and additional vehicles may be present with respective additional sets of mobile communication devices, video cameras, speakers, microphones, and/or transceivers.

Each of the portable radio 104, RSM video capture device 106, laptop 114, and vehicular mobile communication device 133 may be capable of directly wirelessly communicating via direct-mode wireless link(s) 142, and/or may be capable of wirelessly communicating via a wireless infrastructure radio access network (RAN) 152 over respective wireless link(s) 140, 144 and via a corresponding transceiver circuits. These devices may be referred to as communication devices and are configured to receive inputs associated with the user 102 and/or provide outputs to the user 102 in addition to communicating information to and from other communication devices and the infrastructure RAN 152.

The portable radio 104, in particular, may be any communication device used for infrastructure RAN or direct-mode media (e.g., voice, audio, video, etc.) communication via a long-range wireless transmitter and/or transceiver that has a transmitter transmit range on the order of miles, e.g., 0.5-50 miles, or 3-20 miles (i.e., long-range in comparison to a short-range transmitter such as a Bluetooth, Zigbee, or NFC transmitter) with other communication devices and/or the infrastructure RAN 152. The long-range transmitter may implement a direct-mode, conventional, or trunked land mobile radio (LMR) standard or protocol such as European Telecommunications Standards Institute (ETSI) Digital Mobile Radio (DMR), a Project 25 (P25) standard defined by the Association of Public Safety Communications Officials International (APCO), Terrestrial Trunked Radio (TETRA), or other LMR radio protocols or standards. In other embodiments, the long range transmitter may implement a Long Term Evolution (LTE), LTE-Advance, or 5G protocol including multimedia broadcast multicast services (MBMS) or single site point-to-multipoint (SC-PTM) over which an open mobile alliance (OMA) push to talk (PTT) over cellular (OMA-PoC), a voice over IP (VoIP), an LTE Direct or LTE Device to Device, or a PTT over IP (PoIP) application may be implemented. In still further embodiments, the long range transmitter may implement a Wi-Fi protocol perhaps in accordance with an IEEE 802.11 standard (e.g., 802.11a, 802.11b, 802.11g) or a WiMAX protocol perhaps operating in accordance with an IEEE 802.16 standard.

In the example of FIG. 1, the portable radio 104 may form the hub of communication connectivity for the user 102, through which other accessory devices, such as a biometric sensor (for example, the biometric sensor wristband 120), an activity tracker, a weapon status sensor (for example, the sensor-enabled holster 118), a heads-up-display (for example, the smart glasses 116), the RSM video capture device 106, and/or the laptop 114 may communicatively couple.

In order to communicate with and exchange video, audio, and other media and communications with the RSM video capture device 106, laptop 114, and/or smart glasses 116, the portable radio 104 may contain one or more physical electronic ports (such as a USB port, an Ethernet port, an audio jack, etc.) for direct electronic coupling with the RSM video capture device 106, laptop 114, and/or smart glasses 116. In some embodiments, the portable radio 104 may contain a short-range transmitter (i.e., short-range in comparison to the long-range transmitter such as a LMR or broadband transmitter) and/or transceiver for wirelessly coupling with the RSM video capture device 106, laptop 114, and/or smart glasses 116. The short-range transmitter may be a Bluetooth, Zigbee, or NFC transmitter having a transmit range on the order of 0.01-100 meters, or 0.1-10 meters. In other embodiments, the RSM video capture device 106, the laptop 114, and/or the smart glasses 116 may contain their own long-range transceivers and may communicate with one another and/or with the infrastructure RAN 152 or vehicular transceiver 136 directly without passing through portable radio 104.

The RSM video capture device 106 provides voice functionality features similar to a traditional RSM, including one or more of acting as a remote microphone that is closer to the user's 102 mouth, providing a remote speaker allowing playback of audio closer to the user's 102 ear, and including a PTT switch or other type of PTT input. The voice and/or audio recorded at the remote microphone may be provided to the portable radio 104 for storage and/or analysis or for further transmission to other mobile communication devices or the infrastructure RAN 152, or may be directly transmitted by the RSM video capture device 106 to other communication devices or to the infrastructure RAN 152. The voice and/or audio played back at the remote speaker may be received from the portable radio 104 or received directly from one or more other communication devices or the infrastructure RAN 152. The RSM video capture device 106 may include a separate physical PTT switch 108 that functions, in cooperation with the portable radio 104 or on its own, to maintain the portable radio 104 and/or RSM video capture device 106 in a monitor only mode, and which switches the device(s) to a transmit-only mode (for half-duplex devices) or transmit and receive mode (for full-duplex devices) upon depression or activation of the PTT switch 108. The portable radio 104 and/or RSM video capture device 106 may form part of a group communications architecture that allows a single communication device to communicate with one or more group members (i.e., talkgroup members not shown in FIG. 1) associated with a particular group of devices at a same time.

Additional features may be provided at the RSM video capture device 106 as well. For example, a display screen 110 may be provided for displaying images, video, and/or text to the user 102 or to someone else. The display screen 110 may be, for example, a liquid crystal display (LCD) screen or an organic light emitting display (OLED) display screen. In some embodiments, a touch sensitive input interface may be incorporated into the display screen 110 as well, allowing the user 102 to interact with content provided on the display screen 110. A soft PTT input may also be provided, for example, via such a touch interface.

A video camera 112 may also be provided at the RSM video capture device 106, integrating an ability to capture images and/or video and store the captured image data (for further analysis) or transmit the captured image data as an image or video stream to the portable radio 104 and/or to other communication devices or to the infrastructure RAN 152 directly. The video camera 112 and RSM remote microphone may be used, for example, for capturing audio and/or video of a field-of-view associated with the user, perhaps including a suspect and the suspect's surroundings, storing the captured image and/or audio data for further analysis or transmitting the captured audio and/or video data as an audio and/or video stream to the portable radio 104 and/or to other communication devices or to the infrastructure RAN 152 directly for further analysis. An RSM remote microphone of the RSM video capture device 106 may be an omni-directional or unidirectional microphone or array of omni-directional or unidirectional microphones that may be capable of identifying a direction from which a captured sound emanated.

In some embodiments, the RSM video capture device 106 may be replaced with a more limited body worn camera that may include the video camera 112 and/or microphone noted above for capturing audio and/or video, but may forego one or more of the features noted above that transform the body worn camera into a more full featured RSM, such as the separate physical PTT switch 108 and the display screen 110, remote microphone functionality for voice communications in cooperation with portable radio 104, and remote speaker.

The laptop 114, in particular, may be any wireless communication device used for infrastructure RAN or direct-mode media communication via a long-range or short-range wireless transmitter with other communication devices and/or the infrastructure RAN 152. The laptop 114 includes a display screen for displaying a user interface to an operating system and one or more applications running on the operating system, such as a broadband PTT communications application, a web browser application, a vehicle history database application, a workflow application, a forms or reporting tool application, an arrest record database application, an outstanding warrant database application, a mapping and/or navigation application, a health information database application, and/or other types of applications that may require user interaction to operate. The laptop 114 display screen may be, for example, an LCD screen or an OLED display screen. In some embodiments, a touch sensitive input interface may be incorporated into the display screen as well, allowing the user 102 to interact with content provided on the display screen. A soft PTT input may also be provided, for example, via such a touch interface.

Front and/or rear-facing video cameras may also be provided at the laptop 114, integrating an ability to capture video and/or audio of the user 102 and the user's 102 surroundings, perhaps including a field-of-view of the user 102 and/or a suspect (or potential suspect) and the suspect's surroundings, and store and/or otherwise process the captured video and/or audio for further analysis or transmit the captured video and/or audio as a video and/or audio stream to the portable radio 104, other communication devices, and/or the infrastructure RAN 152 for further analysis.

An in-ear or over-the ear earpiece or headphone 115 may be present for providing audio to the user in a private fashion that is not accessible to other users nearby the user 102. The earpiece or headphone 115 may be wiredly or wirelessly communicatively coupled to one or both of the RSM 106 and the portable radio 104, which may be configured to provide audio received from the RAN 152 and/or from other users to the user 102 based on a manual configuration of the RSM 106 or the portable radio 104, or based on some automatic routing mechanism at the one of the RSM 106 and the portable radio 104 that may route all audio to the earpiece or headphone whenever it is detected as connected to the one of the RSM 106 and the portable radio 104, or may selectively route audio received at the one of the RSM 106 and the portable radio 104 to the earpiece or headphone based on various contextual parameters, such as a content of the received audio, an identity of who sent the received audio, a covert status of the user 102, an incident status of the user 102, a determination of nearby users associated with the user 102, or some other contextual parameter.

The smart glasses 116 may include a digital imaging device, an electronic processor, a short-range and/or long-range transceiver device, and/or a projecting device. The smart glasses 116 may maintain a bi-directional connection with the portable radio 104 and provide an always-on or on-demand video feed pointed in a direction of the user's 102 gaze via the digital imaging device, and/or may provide a personal display via the projection device integrated into the smart glasses 116 for displaying information such as text, images, or video received from the portable radio 104 or directly from the infrastructure RAN 152. In some embodiments, the smart glasses 116 may include its own long-range transceiver and may communicate with other communication devices and/or with the infrastructure RAN 152 or vehicular transceiver 136 directly without passing through portable radio 104. In other embodiments, an additional user interface mechanism such as a touch interface or gesture detection mechanism may be provided at the smart glasses 116 that allows the user 102 to interact with the display elements displayed on the smart glasses 116 or projected into the user's 102 eyes, or to modify operation of the digital imaging device. In still other embodiments, a display and input interface at the portable radio 104 may be provided for interacting with smart glasses 116 content and modifying operation of the digital imaging device, among other possibilities.

The smart glasses 116 may provide a virtual reality interface in which a computer-simulated reality electronically replicates an environment with which the user 102 may interact. In some embodiments, the smart glasses 116 may provide an augmented reality interface in which a direct or indirect view of real-world environments in which the user is currently disposed are augmented (i.e., supplemented, by additional computer-generated sensory input such as sound, video, images, graphics, GPS data, or other information). In still other embodiments, the smart glasses 116 may provide a mixed reality interface in which electronically generated objects are inserted in a direct or indirect view of real-world environments in a manner such that they may co-exist and interact in real time with the real-world environment and real world objects.

The sensor-enabled holster 118 may be an active (powered) or passive (non-powered) sensor that maintains and/or provides state information regarding a weapon or other item normally disposed within the user's 102 sensor-enabled holster 118. The sensor-enabled holster 118 may detect a change in state (presence to absence) and/or an action (removal) relative to the weapon normally disposed within the sensor-enabled holster 118. The detected change in state and/or action may be reported to the portable radio 104 via its short-range transceiver. In some embodiments, the sensor-enabled holster 118 may also detect whether the first responder's hand is resting on the weapon even if it has not yet been removed from the holster and provide such information to portable radio 104. Other possibilities exist as well.

The biometric sensor wristband 120 may be an electronic device for tracking an activity of the user 102 or a health status of the user 102, and may include one or more movement sensors (such as an accelerometer, magnetometer, and/or gyroscope) that may periodically or intermittently provide to the portable radio 104 indications of orientation, direction, steps, acceleration, and/or speed, and indications of health such as one or more of a captured heart rate, a captured breathing rate, and a captured body temperature of the user 102, perhaps accompanying other information. In some embodiments, the biometric sensor wristband 120 may include its own long-range transceiver and may communicate with other communication devices and/or with the infrastructure RAN 152 or vehicular transceiver 136 directly without passing through portable radio 104.

An accelerometer is a device that measures acceleration. Single and multi-axis models are available to detect magnitude and direction of the acceleration as a vector quantity, and may be used to sense orientation, acceleration, vibration shock, and falling. A gyroscope is a device for measuring or maintaining orientation, based on the principles of conservation of angular momentum. One type of gyroscope, a microelectromechanical system (MEMS) based gyroscope, uses lithographically constructed versions of one or more of a tuning fork, a vibrating wheel, or resonant solid to measure orientation. Other types of gyroscopes could be used as well. A magnetometer is a device used to measure the strength and/or direction of the magnetic field in the vicinity of the device, and may be used to determine a direction in which a person or device is facing.

The heart rate sensor may use electrical contacts with the skin to monitor an electrocardiography (EKG) signal of its wearer, or may use infrared light and imaging devices to optically detect a pulse rate of its wearer, among other possibilities.

A breathing rate sensor may be integrated within the sensor wristband 120 itself, or disposed separately and communicate with the sensor wristband 120 via a short range wireless or wired connection. The breathing rate sensor may include use of a differential capacitive circuits or capacitive transducers to measure chest displacement and thus breathing rates. In other embodiments, a breathing sensor may monitor a periodicity of mouth and/or nose-exhaled air (e.g., using a humidity sensor, temperature sensor, capnometer or spirometer) to detect a respiration rate. Other possibilities exist as well.

A body temperature sensor may include an electronic digital or analog sensor that measures a skin temperature using, for example, a negative temperature coefficient (NTC) thermistor or a resistive temperature detector (RTD), may include an infrared thermal scanner module, and/or may include an ingestible temperature sensor that transmits an internally measured body temperature via a short range wireless connection, among other possibilities.

Although the biometric sensor wristband 120 is shown in FIG. 1 as a bracelet worn around the wrist, in other examples, the biometric sensor wristband 120 may additionally and/or alternatively be worn around another part of the body, or may take a different physical form including an earring, a finger ring, a necklace, a glove, a belt, or some other type of wearable, ingestible, or insertable form factor.

Other sensors may also be included. For example, internal and external environmental sensors may be used to provide an indication of the environment of the user (e.g. concentration of dangerous gasses, position of the user, etc.).

The portable radio 104, RSM video capture device 106, laptop 114, smart glasses 116, sensor-enabled holster 118, and/or biometric sensor wristband 120 may form a personal area network (PAN) via corresponding short-range PAN transceivers, which may be based on a Bluetooth, Zigbee, or other short-range wireless protocol having a transmission range on the order of meters, tens of meters, or hundreds of meters.

The portable radio 104 and/or RSM video capture device 106 (or any other electronic device in FIG. 1, for that matter) may each include a location determination device integrated with or separately disposed in the portable radio 104 and/or RSM 106 and/or in respective receivers, transmitters, or transceivers of the portable radio 104 and RSM 106 for determining a location of the portable radio 104 and RSM 106. The location determination device may be, for example, a global positioning system (GPS) receiver or wireless triangulation logic using a wireless receiver or transceiver and a plurality of wireless signals received at the wireless receiver or transceiver from different locations, among other possibilities. The location determination device may also include an orientation sensor for determining an orientation that the device is facing. Each orientation sensor may include a gyroscope and/or a magnetometer. Other types of orientation sensors could be used as well. The location may then be stored locally or transmitted via the transmitter or transceiver to other communication devices and/or to the infrastructure RAN 152.

The vehicle 132 associated with the user 102 may include the mobile communication device 133, the vehicular video camera 134 and/or microphone, and the vehicular transceiver 136, all of which may be coupled to one another via a wired and/or wireless vehicle area network (VAN), perhaps along with other sensors physically or communicatively coupled to the vehicle 132. The vehicular transceiver 136 may include a long-range transceiver for directly wirelessly communicating with communication devices such as the portable radio 104, the RSM 106, and the laptop 114 via wireless link(s) 142 and/or for wirelessly communicating with the RAN 152 via wireless link(s) 144. The vehicular transceiver 136 may further include a short-range wireless transceiver or wired transceiver for communicatively coupling between the mobile communication device 133 and/or the vehicular video camera 134 in the VAN. The mobile communication device 133 may, in some embodiments, include the vehicular transceiver 136 and/or the vehicular video camera 134 integrated therewith, and may operate to store and/or process video and/or audio produced by the video camera 134 and/or transmit the captured video and/or audio as a video and/or audio stream to the portable radio 104, other communication devices, and/or the infrastructure RAN 152 for further analysis. The omni-directional or unidirectional microphone, or an array thereof, may be integrated in the video camera 134 and/or at the vehicular computing device 133 (or additionally or alternatively made available at a separate location of the vehicle 132) and communicably coupled to the vehicular computing device 133 and/or vehicular transceiver 136 for capturing audio and storing, processing, and/or transmitting the audio in a same or similar manner as set forth above with respect to the RSM 106.

Although FIG. 1 illustrates the vehicular video camera 134 and microphone as being placed inside the vehicle 132, in other embodiments, one or both of the vehicular video camera 134 and microphone may be placed at visible or hidden locations outside of the vehicle 132, such as within a vehicular grill portion or bumper portion, or on a roof portion, of the vehicle 132. Further, although FIG. 1 illustrates the single speaker as being placed inside of the vehicle 132 and coupled to the vehicular computing device 133, in other embodiments, multiple speakers may be provided inside and/or outside of the vehicle 132 (all addressed simultaneously or individually addressable for outputting separate audio streams), or the single speaker 137 may be placed outside of the vehicle and function as a PA speaker, among other possibilities.

The vehicle 132 may be a human-operable vehicle, or may be a self-driving vehicle operable under control of mobile communication device 133 perhaps in cooperation with video camera 134 (which may include a visible-light camera, an infrared camera, a time-of-flight depth camera, and/or a light detection and ranging (LiDAR) device). Command information and/or status information such as location and speed may be exchanged with the self-driving vehicle via the VAN and/or the PAN (when the PAN is in range of the VAN or via the VAN's infrastructure RAN link).

The vehicle 132 and/or transceiver 136, similar to the portable radio 104 and/or respective receivers, transmitters, or transceivers thereof, may include a location (and/or orientation) determination device integrated with or separately disposed in the mobile communication device 133 and/or transceiver 136 for determining (and storing and/or transmitting) a location (and/or orientation) of the vehicle 132.

In some embodiments, instead of a vehicle 132, a land, air, or water-based drone with the same or similar audio and/or video and communications capabilities and the same or similar self-navigating capabilities as set forth above may be disposed, and may similarly communicate with the user's 102 PAN and/or with the infrastructure RAN 152 to support the user 102 in the field.

The VAN may communicatively couple with the PAN disclosed above when the VAN and the PAN come within wireless transmission range of one another, perhaps after an authentication takes place there between. In some embodiments, one of the VAN and the PAN may provide infrastructure communications to the other, depending on the situation and the types of devices in the VAN and/or PAN and may provide interoperability and communication links between devices (such as video cameras and sensors) within the VAN and PAN.

Although the RSM 106, the laptop 114, and the vehicle 132 are illustrated in FIG. 1 as providing example video cameras and/or microphones for use in capturing audio and/or video streams, other types of cameras and/or microphones could be used as well, including but not limited to, fixed or pivotable video cameras secured to lamp posts, automated teller machine (ATM) video cameras, other types of body worn cameras such as head-mounted cameras, other types of vehicular cameras such as roof-mounted cameras, or other types of audio and/or video recording devices accessible via a wired or wireless network interface same or similar to that disclosed herein.

Infrastructure RAN 152 is a radio access network that provides for radio communication links to be arranged within the network between a plurality of user terminals. Such user terminals may be portable, mobile, or stationary and may include any one or more of the communication devices illustrated in FIG. 1, among other possibilities. At least one other terminal, e.g. used in conjunction with the communication devices, may be a fixed terminal, e.g. a base station, eNodeB, repeater, and/or access point. Such a RAN typically includes a system infrastructure that generally includes a network of various fixed terminals, which are in direct radio communication with the communication devices. Each of the fixed terminals operating in the RAN 152 may have one or more transceivers which may, for example, serve communication devices in a given region or area, known as a 'cell' or 'site', by radio frequency (RF)

communication. The communication devices that are in direct communication with a particular fixed terminal are said to be served by the fixed terminal. In one example, all radio communications to and from each communication device within the RAN 152 are made via respective serving fixed terminals. Sites of neighboring fixed terminals may be offset from one another and may provide corresponding non-overlapping or partially or fully overlapping RF coverage areas.

Infrastructure RAN 152 may operate according to an industry standard wireless access technology such as, for example, an LTE, LTE-Advance, or 5G technology over which an OMA-PoC, a VoIP, an LTE Direct or LTE Device to Device, or a PoIP application may be implemented. Additionally or alternatively, infrastructure RAN 152 may implement a WLAN technology such as Wi-Fi perhaps operating in accordance with an IEEE 802.11 standard (e.g., 802.11a, 802.11b, 802.11g) or such as a WiMAX perhaps operating in accordance with an IEEE 802.16 standard.

Infrastructure RAN 152 may additionally or alternatively operate according to an industry standard LMR wireless access technology such as, for example, the P25 standard defined by the APCO, the TETRA standard defined by the ETSI, the dPMR standard also defined by the ETSI, or the DMR standard also defined by the ETSI. Because these systems generally provide lower throughput than the broadband systems, they are sometimes designated as narrowband RANs.

Communications in accordance with any one or more of these protocols or standards, or other protocols or standards, may take place over physical channels in accordance with one or more of a TDMA (time division multiple access), FDMA (frequency division multiple access), OFDMA (orthogonal frequency division multiplexing access), or CDMA (code division multiple access) technique.

OMA-PoC, in particular and as one example of an infrastructure broadband wireless application, enables familiar PTT and "instant on" features of traditional half duplex communication devices, but uses communication devices operating over modern broadband telecommunications networks. Using OMA-PoC, wireless communication devices such as mobile telephones and notebook computers can function as PTT half-duplex communication devices for transmitting and receiving. Other types of PTT models and multimedia call models (MMCMs) are also available.

Floor control in an OMA-PoC session is generally maintained by a PTT server that controls communications between two or more wireless communication devices. When a user of one of the communication devices keys a PTT button, a request for permission to speak in the OMA-PoC session is transmitted from the user's communication device to the PTT server using, for example, a real-time transport protocol (RTP) message. If no other users are currently speaking in the PoC session, an acceptance message is transmitted back to the user's communication device and the user may then speak into a microphone of the communication device. Using standard compression/decompression (codec) techniques, the user's voice is digitized and transmitted using discrete auditory data packets (e.g., together which form an auditory data stream over time), such as according to RTP and internet protocols (IP), to the PTT server. The PTT server then transmits the auditory data packets to other users of the PoC session (e.g., to other communication devices in the group of communication devices or talkgroup to which the user is subscribed), using for example, one or more of a unicast, point to multipoint, or broadcast communication technique.

Infrastructure narrowband LMR wireless systems, on the other hand, operate in either a conventional or trunked configuration. In either configuration, a plurality of communication devices is partitioned into separate groups of communication devices. In a conventional narrowband system, each communication device in a group is selected to a particular radio channel (frequency or frequency & time slot) for communications associated with that communication device's group. Thus, each group is served by one channel, and multiple groups may share the same single frequency or frequency & time slot (in which case, in some embodiments, group IDs may be present in the group data to distinguish between groups).

In contrast, a trunked radio system and its communication devices use a pool of traffic channels for virtually an unlimited number of groups of communication devices (and which may also be referred to herein as talkgroups). Thus, all groups are served by all channels. The trunked radio system works to take advantage of the probability that not all groups need a traffic channel for communication at the same time. When a member of a group requests a call on a control or rest channel on which all of the communication devices at a site idle awaiting new call notifications, in one embodiment, a call controller assigns a separate traffic channel for the requested group call, and all group members move from the assigned control or rest channel to the assigned traffic channel for the group call. In another embodiment, when a member of a group requests a call on a control or rest channel, the call controller may convert the control or rest channel on which the communication devices were idling to a traffic channel for the call, and instruct all communication devices that are not participating in the new call to move to a newly assigned control or rest channel selected from the pool of available channels. With a given number of channels, a much greater number of groups may be accommodated in a trunked radio system as compared with a conventional radio system.

Group calls may be made between wireless and/or wireline participants in accordance with either a narrowband or a broadband protocol or standard. Group members for group calls may be statically or dynamically defined. That is, in a first example, a user or administrator working on behalf of the user may indicate to the switching and/or radio network (perhaps at a call controller, PTT server, zone controller, or mobile management entity (MME), base station controller (BSC), mobile switching center (MSC), site controller, Push-to-Talk controller, or other network device) a list of participants of a group at the time of the call or in advance of the call. The group members (e.g., communication devices) could be provisioned in the network by the user or an agent, and then provided some form of group identity or identifier, for example. Then, at a future time, an originating user in a group may cause some signaling to be transmitted indicating that he or she wishes to establish a communication session (e.g., group call) with each of the pre-designated participants in the defined group. In another example, communication devices may dynamically affiliate with a group (and also disassociate with the group) perhaps based on user input, and the switching and/or radio network may track group membership and route new group calls according to the current group membership.

In some instances, broadband and narrowband systems may be interfaced via a middleware system that translates between a narrowband PTT standard protocol (such as P25) and a broadband PTT standard protocol or application (such as OMA-PoC). Such intermediate middleware may include a middleware server for performing the translations and may be disposed in the cloud, disposed in a dedicated on-premises location for a client wishing to use both technologies, or disposed at a public carrier supporting one or both technologies. For example, and with respect to FIG. 1, such a middleware server may be disposed in infrastructure RAN 152 at infrastructure controller 156 or at a separate cloud computing cluster such as cloud compute cluster 162 communicably coupled to controller 156 via internet protocol (IP) network 160, among other possibilities.

The infrastructure RAN 152 is illustrated in FIG. 1 as providing coverage for the portable radio 104, RSM video capture device 106, laptop 114, smart glasses 116, and/or vehicle transceiver 136 via a single fixed terminal 154 coupled to a single infrastructure controller 156 (e.g., a radio controller, call controller, PTT server, zone controller, MME, BSC, MSC, site controller, Push-to-Talk controller, or other network device) and including a dispatch console 158 operated by a dispatcher. In other embodiments, additional fixed terminals and additional controllers may be disposed to support a larger geographic footprint and/or a larger number of mobile devices.

The infrastructure controller 156 illustrated in FIG. 1, or some other back-end infrastructure device or combination of back-end infrastructure devices existing on-premises or in the remote cloud compute cluster 162 accessible via the IP network 160 (such as the Internet), may additionally or alternatively operate as a back-end electronic digital assistant, a back-end audio and/or video processing device, and/or a remote cloud-based storage device consistent with the remainder of this disclosure.

The IP network 160 may comprise one or more routers, switches, LANs, WLANs, WANs, access points, or other network infrastructure, including but not limited to, the public Internet. The cloud compute cluster 162 may be comprised of a plurality of computing devices, such as the one set forth in FIG. 2, one or more of which may be executing none, all, or a portion of an electronic digital assistant service, sequentially or in parallel, across the one or more computing devices. The one or more computing devices comprising the cloud compute cluster 162 may be geographically co-located or may be separated by inches, meters, or miles, and inter-connected via electronic and/or optical interconnects. Although not shown in FIG. 1, one or more proxy servers or load balancing servers may control which one or more computing devices perform any part or all of the electronic digital assistant service.

Database(s) 164 may be accessible via IP network 160 and/or cloud compute cluster 162, and may include databases such as a long-term video storage database, a historical or forecasted weather database, an offender database perhaps including facial recognition images to match against, a cartographic database of streets and elevations, a traffic database of historical or current traffic conditions, or other types of databases. Databases 164 may further include all or a portion of the databases described herein as being provided at infrastructure controller 156. In some embodiments, the databases 164 may be maintained by third parties (for example, the National Weather Service or a Department of Transportation, respectively). As shown in FIG. 1, the databases 164 are communicatively coupled with the infrastructure RAN 152 to allow the communication devices (for example, the portable radio 104, the RSM video capture device 106, the laptop 114, and the mobile communication device 133) to communicate with and retrieve data from the databases 164 via infrastructure controller 156 and IP network 160. In some embodiments, the databases 164 are commercial cloud-based storage devices. In some embodiments, the databases 164 are housed on suitable on-premises database servers. The databases 164 of FIG. 1 are merely examples. In some embodiments, the system 100 additionally or alternatively includes other databases that store different information. In some embodiments, the databases 164 disclosed herein and/or additional or other databases are integrated with, or internal to, the infrastructure controller 156.

Finally, although FIG. 1 describes a communication system 100 generally as a public safety communication system that includes a user 102 generally described as a police officer and a vehicle 132 generally described as a police car or cruiser, in other embodiments, the communication system 100 may additionally or alternatively be a retail communication system including a user 102 that may be an employee of a retailer and a vehicle 132 that may be a vehicle for use by the user 102 in furtherance of the employee's retail duties (e.g., a shuttle or self-balancing scooter). In other embodiments, the communication system 100 may additionally or alternatively be a warehouse communication system including a user 102 that may be an employee of a warehouse and a vehicle 132 that may be a vehicle for use by the user 102 in furtherance of the employee's retail duties (e.g., a forklift). In still further embodiments, the communication system 100 may additionally or alternatively be a private security communication system including a user 102 that may be an employee of a private security company and a vehicle 132 that may be a vehicle for use by the user 102 in furtherance of the private security employee's duties (e.g., a private security vehicle or motorcycle). In even further embodiments, the communication system 100 may additionally or alternatively be a medical communication system including a user 102 that may be a doctor or nurse of a hospital and a vehicle 132 that may be a vehicle for use by the user 102 in furtherance of the doctor or nurse's duties (e.g., a medical gurney or an ambulance). In still another example embodiment, the communication system 100 may additionally or alternatively be a heavy machinery communication system including a user 102 that may be a miner, driller, or extractor at a mine, oil field, or precious metal or gem field and a vehicle 132 that may be a vehicle for use by the user 102 in furtherance of the miner, driller, or extractor's duties (e.g., an excavator, bulldozer, crane, front loader). As one other example, the communication system 100 may additionally or alternatively be a transportation logistics communication system including a user 102 that may be a bus driver or semi-truck driver at a school or transportation company and a vehicle 132 that may be a vehicle for use by the user 102 in furtherance of the driver's duties. In the examples of a user 102 being other than a police officer, certain sensors such as the weapon status sensor described above with respect to the police officer user may be replaced or supplemented with other types of sensors, such as one or more sensors that may detect whether a particular retail, warehouse, private security, heavy machinery operator, transportation driver, or other type of user has equipment necessary to perform a particular assigned or to-be-assigned task, whether such equipment is in a workable or sufficient condition, or whether the equipment is sufficient for the area or environment the user is in. Other possibilities and other variations exist as well.

b. Device Structure

Figure 2:
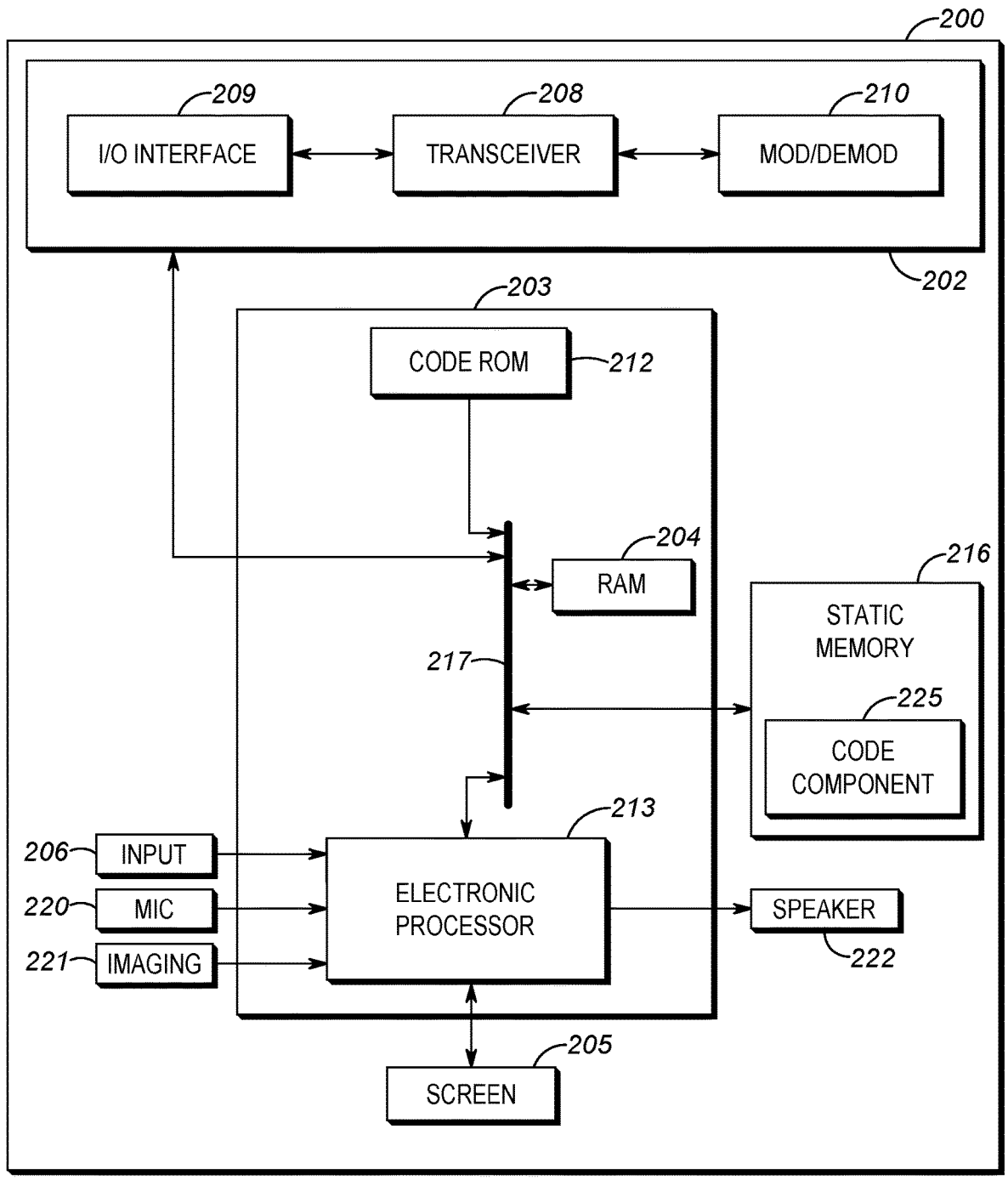
FIG. 2 is a device diagram showing a device structure of an electronic computing device for operating an electronic digital assistant, in accordance with some embodiments.

FIG. 2 sets forth a schematic diagram that illustrates a communication device 200 according to some embodiments of the present disclosure. The communication device 200 may be, for example, embodied in the portable radio 104, the RSM video capture device 106, the laptop 114, the mobile communication device 133, the infrastructure controller 156, the dispatch console 158, one or more computing devices in the cloud compute cluster 162, or some other communication device not illustrated in FIG. 1, and/or may be a distributed communication device across two or more of the foregoing (or multiple of a same type of one of the foregoing) and linked via a wired and/or wireless communication link(s). In some embodiments, the communication device 200 (for example, the portable radio 104) may be communicatively coupled to other devices such as the sensor-enabled holster 118 as described above. In such embodiments, the combination of the portable radio 104 and the sensor-enabled holster 118 may be considered a single communication device 200.

While FIG. 2 represents the communication devices described above with respect to FIG. 1, depending on the type of the communication device, the communication device 200 may include fewer or additional components in configurations different from that illustrated in FIG. 2. For example, in some embodiments, communication device 200 acting as the infrastructure controller 156 may not include one or more of the screen 205, input device 206, microphone 220, imaging device 221, and speaker 222. As another example, in some embodiments, the communication device 200 acting as the portable radio 104 or the RSM video capture device 106 may further include a location determination device (for example, a global positioning system (GPS) receiver) as explained above. Other combinations are possible as well.

As shown in FIG. 2, communication device 200 includes a communications unit 202 coupled to a common data and address bus 217 of a processing unit 203. The communication device 200 may also include one or more input devices (e.g., keypad, pointing device, touch-sensitive surface, etc.) 206 and an electronic display screen 205 (which, in some embodiments, may be a touch screen and thus also act as an input device 206), each coupled to be in communication with the processing unit 203.

The microphone 220 may be present for capturing audio from a user and/or other environmental or background audio that is further processed by processing unit 203 in accordance with the remainder of this disclosure and/or is transmitted as voice or audio stream data, or as acoustical environment indications, by communications unit 202 to other portable radios and/or other communication devices. The imaging device 221 may provide video (still or moving images) of an area in a field of view of the communication device 200 for further processing by the processing unit 203 and/or for further transmission by the communications unit 202. A speaker 222 may be present for reproducing audio that is decoded from voice or audio streams of calls received via the communications unit 202 from other portable radios, from digital audio stored at the communication device 200, from other ad-hoc or direct mode devices, and/or from an infrastructure RAN device, or may playback alert tones or other types of pre-recorded audio.

The processing unit 203 may include a code Read Only Memory (ROM) 212 coupled to the common data and address bus 217 for storing data for initializing system components. The processing unit 203 may further include an electronic processor 213 (for example, a microprocessor or another electronic device) coupled, by the common data and address bus 217, to a Random Access Memory (RAM) 204 and a static memory 216.

The communications unit 202 may include one or more wired and/or wireless input/output (I/O) interfaces 209 that are configurable to communicate with other communication devices, such as the portable radio 104, the laptop 114, the wireless RAN 152, and/or the mobile communication device 133.

For example, the communications unit 202 may include one or more wireless transceivers 208, such as a DMR transceiver, a P25 transceiver, a Bluetooth transceiver, a Wi-Fi transceiver perhaps operating in accordance with an IEEE 802.11 standard (e.g., 802.11a, 802.11b, 802.11g), an LTE transceiver, a WiMAX transceiver perhaps operating in accordance with an IEEE 802.16 standard, and/or another similar type of wireless transceiver configurable to communicate via a wireless radio network.

The communications unit 202 may additionally or alternatively include one or more wireline transceivers 208, such as an Ethernet transceiver, a USB transceiver, or similar transceiver configurable to communicate via a twisted pair wire, a coaxial cable, a fiber-optic link, or a similar physical connection to a wireline network. The transceiver 208 is also coupled to a combined modulator/demodulator 210.

The electronic processor 213 has ports for coupling to the display screen 205, the input device 206, the microphone 220, the imaging device 221, and/or the speaker 222. Static memory 216 may store operating code 225 for the electronic processor 213 that, when executed, performs one or more of the steps set forth in FIGS. 3 and 4 and the accompanying text.

In some embodiments, static memory 216 may also store, permanently or temporarily, a threshold level mapping indicating numerical ranges at which auditory output generated by the electronic digital assistant may be lengthened and/or shortened, a database of acronyms and their associated full terms for use in transitioning between one or the other based on a detected acoustic environment, a thesaurus database of words having similar meanings and including a syllable count for use in transitioning between them based on a detected acoustic environment, a 10-code database including the 10-code and the 10-codes associated full term meaning for use in transitioning between one or the other based on a detected acoustic environment, a contraction database setting forth contractions and the words they stand for use in transitioning between one or the other based on a detected acoustic environment, and an abbreviation database including the abbreviation and the full word that the abbreviation abbreviates for use in transitioning between one or the other based on a detected acoustic environment.

The static memory 216 may comprise, for example, a hard-disk drive (HDD), an optical disk drive such as a compact disk (CD) drive or digital versatile disk (DVD) drive, a solid state drive (SSD), a flash memory drive, or a tape drive, and the like.

2. Processes for Digital Assistant Receiving Intent Input from Another User.

In some embodiments, an individual component and/or a combination of individual components of the system 100 may be referred to as an electronic computing device that implements an electronic digital assistant as mentioned above. For example, the electronic computing device may be a single electronic processor (for example, the electronic processor 213 of the portable radio 104). In other embodiments, the electronic computing device includes multiple electronic processors distributed remotely from each other. For example, the electronic computing device may be implemented on a combination of at least two of the electronic processor 213 of the portable radio 104, the electronic processor 213 of the infrastructure controller 156, and the electronic processor 213 of a back-end cloud compute cluster 162 accessible via the IP network 160.

To use the electronic digital assistant implemented by the electronic computing device, a responder (not shown) may, for example, provide an oral query or statement via the talkgroup that is received by the virtual assistant associated with the communication device 200. The virtual assistant receives signals representative of the oral query or statement from the microphone 220 and analyzes the signals to determine the content of the oral query or statement. For example, the electronic computing device may include a natural language processing (NLP) engine configured to determine the intent and/or content of the oral query or statement. The electronic computing device may also be configured to determine a response to the oral query (for example, by retrieving stored data or by requesting data from a database such as one of the databases 164) and provide the response to the talkgroup via a generated audio response transmitted via the RAN. In other words, one or more of the communication device 200, embodied in one or more of the communication devices of FIG. 1, such as the portable radio 104, the infrastructure controller 156, and/or the cloud compute cluster 162, may include an NLP engine to analyze oral queries and/or statements received by the virtual assistant associated with the communication device 200 and provide responses to the oral queries and/or take other actions in response to the oral statements.

Although an oral query and/or statement is described above, in some embodiments, the electronic computing device receives and responds to other types of queries and inputs. For example, the user 102 may submit a text query or statement to the electronic computing device by typing the text query or statement into a hard keyboard input device 206 or a soft keyboard input provided on the screen 205 of the communication device 200. As another example, the user 102 may use the imaging device 221 to capture an image or video of an area and press a hard or soft key to send the image or video to the electronic computing device to, for example, allow the electronic computing device to identify an object in the image or video and provide a response and/or take other actions.

Figure 3:
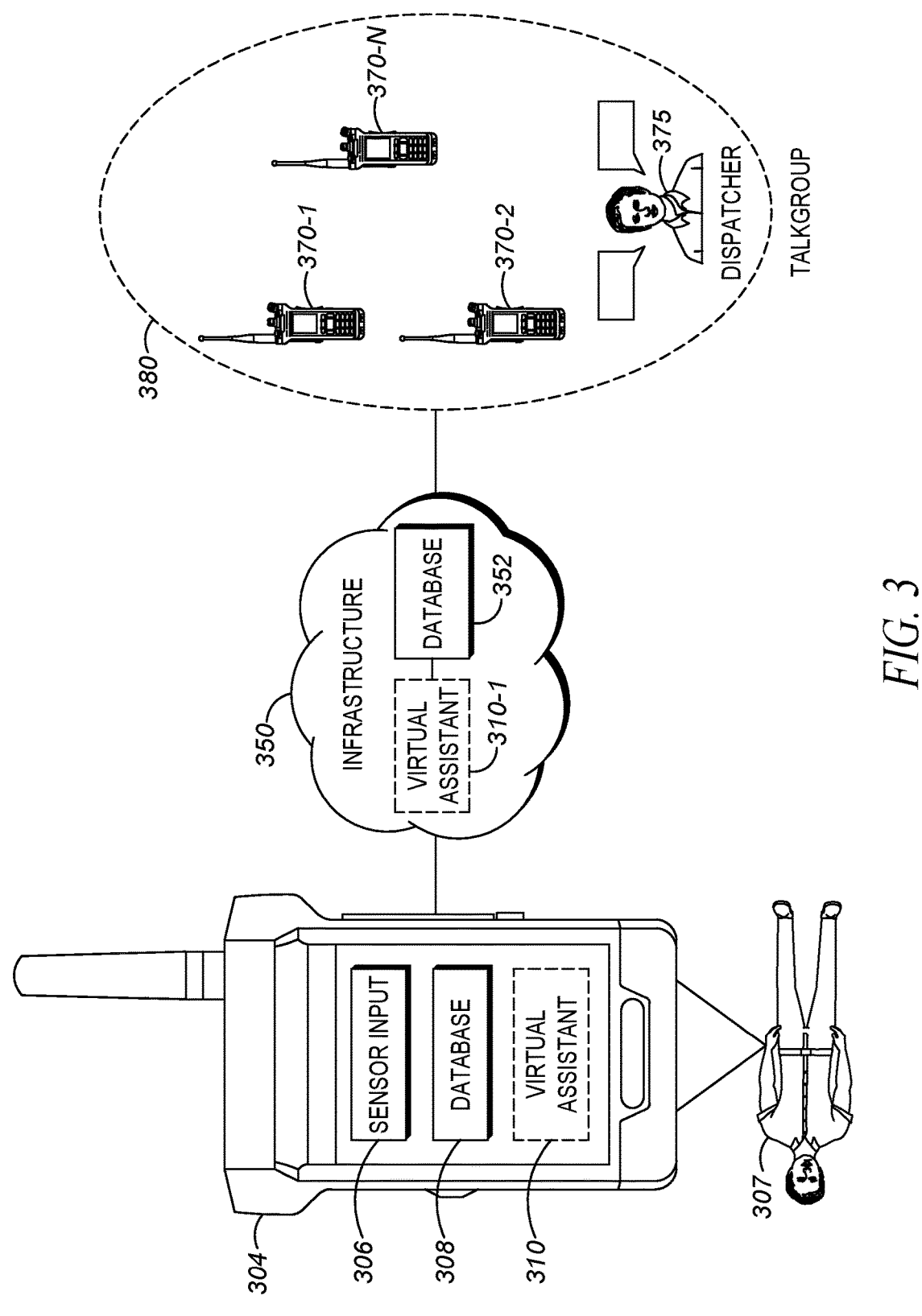
FIG. 3 is a simplified example environment in which the techniques described herein may be implemented.

FIG. 3 is a simplified example environment in which the techniques described herein may be implemented. System 300 may include lone worker 302, infrastructure 350, other workers 370-1, 2 . . . n, and dispatcher 375.

Lone worker 302 may carry a communications device 304. Communications device 304 may be very similar to the device described with respect to FIG. 2. For ease of description, the details described in FIG. 2 are not repeated here. Communications device 304 may receive sensor input 306. Sensor input may be provided by sensors integrated within the communications device 304. For example, communications device 304 may be equipped with accelerometers to determine device position/motion, GPS sensors, temperature sensors, etc.

Communications device 304 may also receive sensor input from external devices. For example, an external environmental sensor that measures temperature, toxic gasses in the environment, sounds, etc. The techniques described herein are not limited to any particular type of sensor. What should be understood is that communications device 304 receives sensor input 306 from any number of sources.

Communications device 304 may also include a database 308 that stores data received from sensor input 306. The database may store sensor data indefinitely or for some fixed period of time (e.g. 5 minutes). In some implementations, the database 308 may periodically send the stored information to infrastructure 350 for storage therein. In other implementations, the database 308 may send the stored sensor data to the infrastructure 350 upon request. In yet other implementations, the database 308 may only maintain the sensor data locally.

Communications device 304 may be associated with a virtual assistant 310. As explained above, a virtual assistant may use NLP to receive queries and provide responses. In some cases, those responses may be based on sensor input 306 that is stored in database 310. The virtual assistant 310 may be listening for a keyword to determine when it is addressed. As explained above, a keyword is similar to a wake word, with the difference being that the keyword is only associated with the specific virtual assistant 310 associated with the specific communications device 304.

It should be understood that virtual assistant 310 is representative of the virtual assistant functionality. Virtual assistant 310 is represented with a dashed line to indicate that the functionality need not be implemented directly on the communications device 304. For example, in some cases the virtual assistant functionality 310-1 may be implemented within the infrastructure 350 (e.g. in the cloud, etc.). The techniques described herein are applicable regardless of where the virtual assistant functionality is implemented.

System 300 may also include infrastructure 350. Infrastructure 350 may generally include elements described with respect to FIG. 1. For ease of description, the detailed description of FIG. 1 is not repeated here. Infrastructure 350 may include the necessary RAN components to allow communications device 304 to communicate with other users 370 and dispatcher 375. Infrastructure 350 may also include cloud computing resources to implement the functionality described herein.

For example, as explained above, virtual assistant functionality 310 may be implemented directly on the communications device 304. However, in other implementations, the virtual assistant functionality may be implemented within the infrastructure 350, as depicted by virtual assistant 310-1. The techniques described herein are usable regardless of where the virtual assistant functionality is implemented. Infrastructure 350 may also include database 352. As explained above, communications device 304 may store sensor input 306 in database 308. In some implementations, the database 352 may be updated with the data stored in database 308. By storing the data locally in database 352, implementations in which the virtual assistant 310-1 is implemented within the infrastructure do not need to query the communications device 304 when responding to queries. Such operation will be described in further detail below.

System 300 may also include multiple other workers, each equipped with their own communications devices 370-1, 2 . . . n. System 300 may also include a dispatcher equipped with his own communications device 375. The other workers 370, dispatcher 375, and lone worker 302 may be included in a talkgroup 380 as depicted by the dotted line. For ease of depiction, lone worker 302 is not shown within the dotted line, but it should be understood that lone worker 302 is part of talkgroup 380.

A talkgroup is a group of users that may communicate with each other using their communications devices. For example, when a user depresses the PTT button on his communication device and is granted access to the communications channel within the infrastructure 350, he may begin speaking. All other users within the talkgroup may then hear what is being said via their own communications device. Once the PTT button is released other users may respond by pressing the PTT button on their own device.

A dispatcher 375 may be a user within the talkgroup that has additional privileges. For example, the dispatcher 375 may be responsible for communicating work assignments to the other workers 370. In some embodiments, as will be explained in further detail below, the dispatcher 375 may play a role in keyword distribution.

In operation, lone worker 302 may have lone worker mode activated. As explained above, in lone worker mode, the worker may be prompted periodically (e.g. every 5 minutes, etc.) to indicate that they are ok. The lone worker may respond by, for example, pressing a button on their communications device 304. If the lone worker 302 does not respond to the prompt, the communications device 304 may enter into an emergency mode and notify the infrastructure 350 that the communications device 304 has gone into the lone worker emergency mode.

As part of the process of going into the lone worker emergency mode, a keyword for the virtual assistant 310 associated with the communications device 304 may be generated. In one implementation, the keyword may have been preprogrammed into the communications device 304. In another implementation, the virtual assistant associated 310 associated with the communications device 304 and running on the communications device 304 may locally generate a keyword. In yet another implementation, the keyword may be generated by the virtual assistant 310-1 that is implemented within the infrastructure 350.

Regardless of where the keyword is generated, what should be understood is that the keyword is unique to the virtual assistant associated with the communications device 304. Thus, it is clear that any query received using the generated keyword is intended for communications device 304. Thus, there is no possibility of confusion as to which virtual assistant is being addressed when the keyword is heard, because the keyword will only be associated with an individual virtual assistant.

The generated keyword may then be distributed to all members of the talkgroup. In some implementations, the distribution of the keyword may be accompanied by an indication that the lone worker 302 communication device has gone into emergency mode. In some implementations, the keyword may be distributed by the communications device 304 using the talkgroup communications channel. For example, the virtual assistant 310 may generate the keyword and then send it out to all talkgroup members by activating the PTT button on the communications device 304.

In other implementations, the virtual assistant 310-1 located in the infrastructure 350 may generate the keyword and distribute it to all talkgroup members via the PTT communications channel. In yet another implementation, the keyword may be generated by either virtual assistant 310, 310-1 and sent to the dispatcher 375. The dispatcher 375 may then relay the generated keyword to all other users on the talkgroup 380 using his own PTT button. Regardless of how the keyword is distributed, it may be accompanied by a message indicating that user 302 was in lone worker mode and is experiencing an emergency. The members of the talkgroup may be notified that queries to the virtual assistant 310, 310-1 of user 302 may be made using the keyword.

A member of the talkgroup 380 may issue a query to the virtual assistant associated with communications device 304 by depressing the PTT key on their own communications device. They may speak the keyword followed by their query. It should be noted that the query may be of any type that the virtual assistant associated with communications device 304 can normally process. In other words, the techniques described herein are not intended to provide additional capabilities to the virtual assistant 310, 310-1, but rather allow for those capabilities to be accessed by all members of the talkgroup 380.

The virtual assistant 310, 310-1 may monitor the talkgroup communications for the presence of the generated keyword. The presence of the generated keyword indicates that what follows is a query to the virtual assistant 310, 310-1. The virtual assistant 310, 310-1 may then receive the query and process it using the NLP/virtual assistant techniques described above. In some cases, the answer to the query may require access to the database 308. For example, a query may request the latest environmental sensor readings to ensure that a rescuer is not entering a hazardous environment that may incapacitate the rescuer.

As explained above, in some implementations, the virtual assistant 310-1 may be implemented within the infrastructure 350. In such implementations, to avoid additional communications with the communications device 304, the contents of the database 310 may be replicated within a database 352 within the infrastructure 350. In some implementations, the replication may occur periodically. In other implementations, the replication may occur upon the communications device 304 entering into the emergency mode.

Upon receipt of the keyword and the query, the virtual assistant 310, 310-1 may provide an answer to the query. The virtual assistant may output this answer to all members of the talkgroup 380 for output using their own communications devices 370, 375. Thus, other members of the talkgroup are able to access the virtual assistant of the communications device 304 that has entered into lone worker emergency mode.

What should be understood is that in some implementations, the keyword is not generated until the communications device 304 has entered into lone worker emergency mode. This provides additional security, as other members of the talkgroup are not able to access the virtual assistant of the communications device 304 at any time other than when the device is in emergency mode. As explained above, use of the unique generated keyword ensures that there is no confusion as to which virtual assistant associated with which device is the target of the query.

Figure 4:
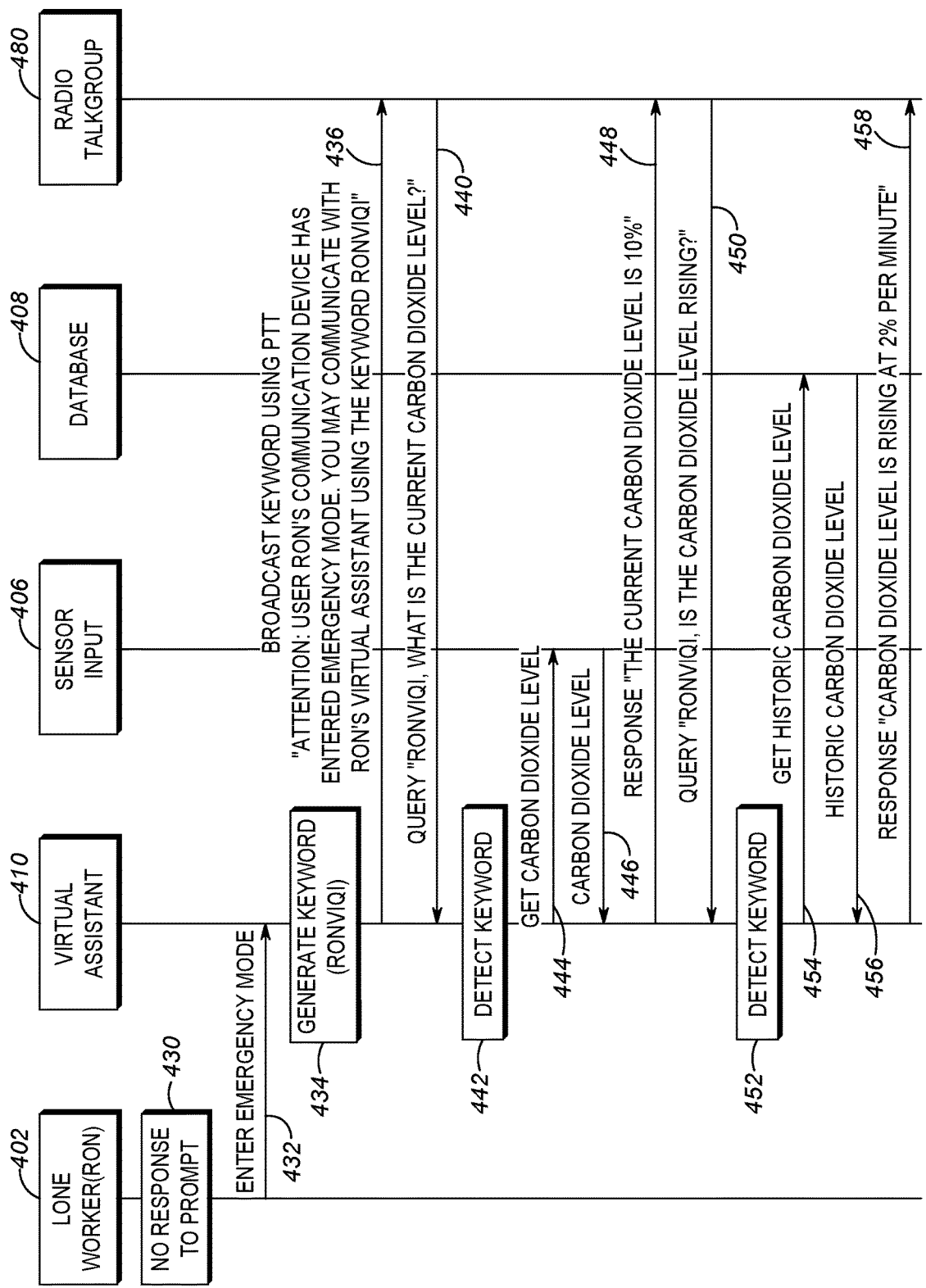
FIG. 4 is an example of an interaction between a virtual assistant and members of a talkgroup according to the techniques described herein.

FIG. 4 is an example of an interaction between a virtual assistant and members of a talkgroup according to the techniques described herein. The participants include a lone worker 402. For purposes of this description, assume that the lone worker 402's name is "Ron." Lone worker Ron 402 may have a communications device (not shown). The communications device may be associated with a virtual assistant 410. As explained above with respect to FIG. 3, the virtual assistant may be implemented within the system infrastructure or on the device itself.

The virtual assistant 410 may also have access to sensor data from the communications device. For example, the virtual assistant may have access to sensor input 406 of the communications device. The virtual assistant may also have access to historical sensor data via database 408. As explained above, the sensor input and database may reside on the communications device itself, or may be periodically synchronized with a database on the infrastructure. The techniques described herein are not dependent on where the sensor input 406 of database 408 is located.

The participants can also include talkgroup members 480. Talkgroup members 480 can include other workers as well as a dispatcher. In general, talkgoup members are people who may respond to lone worker 402 Ron in the case of an emergency.

Initially, assume that lone worker 402 Ron's communication device is in lone worker mode. As such, Ron 402 may be prompted to periodically indicate that everything is ok. For example, this indication may be provided by pressing a button on the communications device. At step 430, no response to the prompt may be received, indicating that Ron may be in an emergency situation in which he is unable to respond to the prompt. The communications device may enter an emergency mode 432.

At step 434, the virtual assistant may generate a keyword that is uniquely associated with the virtual assistant associated with Ron's communication device. For purposes of this example, assume that the unique keyword generated is "RonViQi." It should be understood that this keyword is for purposes of explanation only and is not intended to imply any specific keyword. What should be understood is that any keyword may be used, so long as it uniquely identifies the virtual assistant associated with Ron's communication device.

At step 436, the keyword may be broadcast to all members of the talkgroup 480 by the virtual assistant using the PTT functionality of the infrastructure. In some implementations, the broadcast may include a message indicating that the lone worker is in an emergency mode. For example, the broadcast may be, "Attention: User Ron's communication device has entered emergency mode. You may communicate with Ron's virtual assistant using the keyword RonViQi." Although a specific message is described, it should be understood that this is for purposes of explanation, and not by way of limitation. Any message that communicates the keyword to other talkgroup members 480 would be usable with the techniques described herein.

A talkgroup member 480 may wish to attempt a rescue of user Ron. The infrastructure, using known techniques, may provide the location of Ron's communication device. Prior to rushing in and providing assistance, the rescuing talkgroup member may wish to first learn about some details of Ron's environment in order to avoid becoming a victim of whatever it is that caused entry into the emergency mode.

For example, at step 440, a talkgroup member 480 may send a query to the virtual assistant 410. In this example, the query may be to determine the current level of Carbon Dioxide in Ron's environment. The talkgroup member may press the PTT button on his communications device and say, "RonViQi, what is the current carbon dioxide level?"

The virtual assistant 410 may monitor the talkgoup communications and receive the query 440 from the talkgroup member 480. The virtual assistant 410 may detect 442 the keyword "RonViQi" and as such determine that it is the target of the query. Using available NLP processing techniques described above, the virtual assistant may parse the query and determine that the answer can be provided by accessing sensor input 406 of Ron's communication device. At step 444 the virtual assistant may request a current carbon dioxide reading from sensor input 406 and receive a response 446 indicating the current level.

The virtual assistant 410 may send a response 448 to the talkgroup members with the result of the query. For example, "the carbon dioxide level is currently 10%." This information may be useful in determining if it is safe to approach Ron or if additional mitigating steps (e.g. obtain an oxygen source) are necessary.

At step 450, a talkgroup member 480 may wish to ask another query of virtual assistant 410. For example, the query may be, "RonViQi, is the carbon dioxide level rising?" Just as above, the virtual assistant 410 may monitor the talkgroup communications and detect 452 the keyword. As above, using available NLP techniques, the virtual assistant 410 may determine that answering the query may require access to historical sensor data contained in the database 408.

The virtual assistant 410 may query 454 the database 408 to determine the historical carbon dioxide levels. The database 408 may respond 456 with the historical levels. The virtual assistant 410 may analyze the results to determine if the carbon dioxide levels are rising or falling. The virtual assistant may then respond 458 to the talkgroup with the answer to the query. For example, the answer may be, "The carbon dioxide levels are rising at 2% per minute."

Although a specific example is described above, the techniques described herein are not so limited. What should be understood is that upon entering an emergency mode, a keyword that is unique to the virtual assistant associated with the communications device that has entered the emergency mode is generated. This unique keyword is then broadcast to all members of the talkgroup. Members of the talkgroup can then query the virtual assistant using the keyword as part of the query. The virtual assistant may monitor the talkgroup, and upon detection of the keyword, determine that what follow is a query directed to itself. Because the virtual assistant initiated the generation of the keyword based upon entering the emergency mode, the query from the talkgroup member may be processed and responded to.

It should be understood that in normal operation, the virtual assistant would normally only respond to queries generated by the communications device user (e.g. Ron). Once the communication device has exited the emergency mode (not shown) the generated keyword may be disabled, such that the virtual assistant would no longer respond to queries from talkgroup members that use the generated keyword.

Furthermore, although a specific example of queries related to sensor data is provided, it should be understood that the techniques described herein are not limited to sensor data. Any query that can be answered by the virtual assistant, whether or not it requires input from sensors, can be answered when the query is received over the talkgroup using the generated keyword. In other words, the generation and broadcast of the keyword is what makes the virtual assistant of a particular communications device available to all members of the talkgroup.

Figure 5:
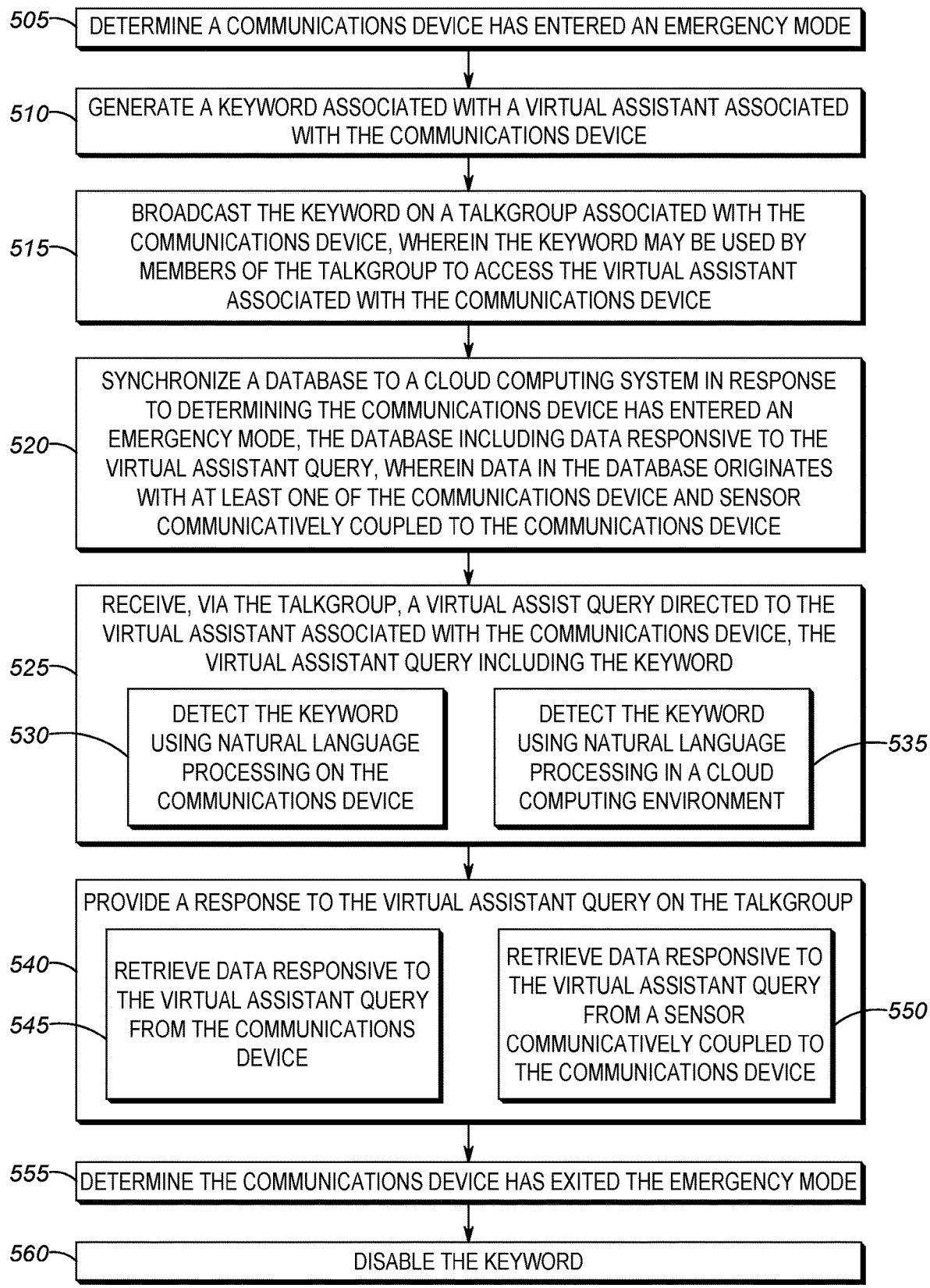
FIG. 5 is a flow diagram of an example implementation of the techniques described herein.

FIG. 5 is a flow diagram of an example implementation of the techniques described herein. In block 505 it may be determined if a communications device has entered an emergency mode. As explained above, in lone worker more, a communications device may prompt the user to provide an indication that the user is ok. If the user does not respond after a period of time, the communications device may assume that there is an emergency and enter into emergency mode. It should also be understood that in many cases the communications device may also have a button that allows the user to manually enter into emergency mode. This may be useful in a case where a worker is severely injured and unable to communicate, but is still conscious and is able to activate the emergency button.

In block 510, a keyword may be generated that is associated with a virtual assistant that is associated with the communications device. Each communications device may, in normal operation, use the same wakeword (e.g. alexa, Ok google, etc.). However, such a wakeword is only usable when there is a single user of the virtual assistant. The generated keyword is associated with the specific virtual assistant that is associated with the specific communications device such that there is no ambiguity in determining which virtual assistant is the intended query recipient when the keyword is used.

In block 515, the keyword may be broadcast on a talkgroup associated with the communications device, wherein the keyword may be used by members of the talkgroup to access the virtual assistant associated with the communications device. In other words, all members of the talkgroup receive the keyword such that the members are informed about how to communicate with the virtual assistant associated with the communications device that has entered into emergency mode.

In block 520, a database on the communications device may be synchronized to a database in a cloud computing system in response to determining the communications device has entered an emergency mode, the database including data responsive to the virtual assistant query, wherein data in the database originates with at least one of the communications device and sensors communicatively coupled to the communications device. As explained above, the communications device may include a database that may be replicated within the cloud infrastructure. In some implementations, the communications device entering emergency mode may trigger the synchronization. In other implementations, the synchronization may be an ongoing process that occurs regardless of if the communications device is in emergency mode. The data in the database may be responsive to a virtual assistant query. The data itself may come from the communications device or from sensors communicatively coupled to the communications device.

In block 525, a virtual assistant query directed to the virtual assistant associated with the communications device may be received via the talkgroup. The virtual assistant query including the keyword. When a member of the talkgroup wishes to send a query to the virtual assistant of the communications device in emergency mode, the query is sent over the talkgroup including the keyword. The virtual assistant that generated the keyword may detect the presence of the keyword.

In one implementation, in block 530, the keyword may be detected using natural language processing on the communications device. This may also be referred to as processing on the edge. The processor or other hardware on the communications device may be programmed to detect the keyword. In a different implementation, in block 535, the keyword may be detected using natural language processing in a cloud computing environment. As explained above, the virtual assistant functionality may be implemented on the communications device itself or within a cloud infrastructure. Regardless of where detected, the presence of the keyword in the query is detected.

In block 540 a response to the virtual assistant query is provided on the talkgroup. As previously mentioned, the virtual assistant is able to answer any query that it was previously capable of answering. The techniques herein allow the virtual assistant to detect the keyword from a communication from a user other than the user associated with the communications device (e.g. some other user on the talkgroup) and then provide an answer to that user over the talkgroup.

In block 545, providing the response to the virtual assistant query may further comprise retrieving data responsive to the virtual assistant query from the communications device. As explained above, the communications device itself may store data that can be useful in responding to virtual assistant queries. For example, this can include data store in a database or data retrieved from sensors integrated within the communications device.

In block 550, providing the response to the virtual assistant query may further comprise retrieving data responsive to the virtual assistant query from sensors communicatively coupled to the communications device. As described above, the communication device may be communicatively coupled with sensors external to the communications device itself. These external sensors may be accessed to retrieve data needed to respond to virtual assistant queries.

In block 555 it may be determined that the communications device has exited the emergency mode. For example, the user may have manually cancelled the emergency mode or the user may respond to the lone worker prompt to indicate all is well. In any case, the communications device is determined to no longer be in emergency mode. In block 560 the keyword may be disabled. By disabling the keyword, the virtual assistant associated with the communications device no longer responds to queries received from the talkgroup. This ensures that other members of the talkgroup cannot access information related to the communications device and/or the lone worker when that device is not in an emergency mode.

As should be apparent from this detailed description, the operations and functions of the electronic computing device are sufficiently complex as to require their implementation on a computer system, and cannot be performed, as a practical matter, in the human mind. Electronic computing devices such as set forth herein are understood as requiring and providing speed and accuracy and complexity management that are not obtainable by human mental steps, in addition to the inherently digital nature of such operations (e.g., a human mind cannot interface directly with RAM or other digital storage, cannot transmit or receive electronic messages, electronically encoded video, electronically encoded audio, etc., and cannot [include a particular function/feature from current spec], among other features and functions set forth herein).

Example embodiments are herein described with reference to flowchart illustrations and/or block diagrams of methods, apparatus (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The methods and processes set forth herein need not, in some embodiments, be performed in the exact sequence as shown and likewise various blocks may be performed in parallel rather than in sequence. Accordingly, the elements of methods and processes are referred to herein as "blocks" rather than "steps."

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational blocks to be performed on the computer or other programmable apparatus to produce a computer implemented process such that the instructions which execute on the computer or other programmable apparatus provide blocks for implementing the functions/acts specified in the flowchart and/or block diagram block or blocks. It is contemplated that any part of any aspect or embodiment discussed in this specification can be implemented or combined with any part of any other aspect or embodiment discussed in this specification.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "one of", without a more limiting modifier such as "only one of", and when applied herein to two or more subsequently defined options such as "one of A and B" should be construed to mean an existence of any one of the options in the list alone (e.g., A alone or B alone) or any combination of two or more of the options in the list (e.g., A and B together).

A device or structure that is "configured" in a certain way is configured in at least that way, but may also be configured in ways that are not listed.

The terms "coupled", "coupling" or "connected" as used herein can have several different meanings depending in the context in which these terms are used. For example, the terms coupled, coupling, or connected can have a mechanical or electrical connotation. For example, as used herein, the terms coupled, coupling, or connected can indicate that two elements or devices are directly connected to one another or connected to one another through an intermediate elements or devices via an electrical element, electrical signal or a mechanical element depending on the particular context.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a non-transitory computer-readable storage medium having computer readable code stored thereon for programming a computer (e.g., comprising a processor) to perform a method as described and claimed herein. Any suitable computer-usable or computer readable medium may be utilized. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. In the context of this document, a computer-usable or computer-readable medium may be any medium that can contain, store, communicate, propagate, or transport the program for use by or in connection with the instruction execution system, apparatus, or device.

Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. For example, computer program code for carrying out operations of various example embodiments may be written in an object oriented programming language such as Java, Smalltalk, C++, Python, or the like. However, the computer program code for carrying out operations of various example embodiments may also be written in conventional procedural programming languages, such as the "C" programming language or similar programming languages. The program code may execute entirely on a computer, partly on the computer, as a stand-alone software package, partly on the computer and partly on a remote computer or server or entirely on the remote computer or server. In the latter scenario, the remote computer or server may be connected to the computer through a local area network (LAN) or a wide area network (WAN), or the connection may be made to an external computer (for example, through the Internet using an Internet Service Provider).

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method comprising:
   determining a communications device has entered an emergency mode;
   when the communications device has entered the emergency mode, generating a keyword associated with a virtual assistant associated with the communications device, wherein the keyword is not generated until an emergency has occurred;
   broadcasting the keyword on a talkgroup associated with the communications device, the talkgroup including a plurality of communications devices, wherein each of the plurality of communications devices is associated with a talkgroup member, wherein the keyword may be used by members of the talkgroup to access the virtual assistant associated with the communications device;
   receiving, from at least one talkgroup member, via the talkgroup, a virtual assistant query directed to the virtual assistant associated with the communications device, the virtual assistant query including the keyword;
   retrieving data responsive to the virtual assistant query from at least one sensor communicatively coupled to the communications device; and
   providing a response to the virtual assistant query on the talkgroup.

2. The method of claim 1 further comprising:
   determining the communications device has exited the emergency mode; and
   disabling the keyword.

3. The method of claim 1 further comprising:
   detecting the keyword using natural language processing on the communications device.

4. The method of claim 1 further comprising:
   detecting the keyword using natural language processing in a cloud computing environment.

5. The method of claim 1 wherein providing the response to the virtual assistant query further comprises:
   retrieving data responsive to the virtual assistant query from the communications device.

6. The method of claim 1 further comprising:
   synchronizing a database to a cloud computing system in response to determining the communications device has entered an emergency mode, the database including data responsive to the virtual assistant query, wherein data in the database originates with at least one of the communications device and sensors communicatively coupled to the communications device.

7. A system comprising:
   a processor; and
   a memory coupled to the processor, the memory containing a set of instructions thereon that when executed by the processor cause the processor to:
   determine a communications device has entered an emergency mode;
   when the communications device has entered the emergency mode, generate a keyword associated with a virtual assistant associated with the communications device, wherein the keyword is not generated until an emergency has occurred;
   broadcast the keyword on a talkgroup associated with the communications device, the talkgroup including a plurality of communications devices, wherein each of the plurality of communications devices is associated with a talkgroup member, wherein the keyword may be used by members of the talkgroup to access the virtual assistant associated with the communications device;
   receive, from at least one talkgroup member, via the talkgroup, a virtual assistant query directed to the virtual assistant associated with the communications device, the virtual assistant query including the keyword;
   retrieve data responsive to the virtual assistant query from at least one sensor communicatively coupled to the communications device; and
   provide a response to the virtual assistant query on the talkgroup.

8. The system of claim 7 further comprising instructions to:
   detect the keyword using natural language processing on the communications device.

9. The system of claim 7 further comprising instructions to:
   detect the keyword using natural language processing in a cloud computing environment.

10. The system of claim 7 wherein the instructions to provide the response to the virtual assistant query further comprises instructions to:
    retrieve data responsive to the virtual assistant query from the communications device.

11. The system of claim 7 further comprising instructions to:
    synchronize a database to a cloud computing system in response to determining the communications device has entered an emergency mode, the database including data responsive to the virtual assistant query, wherein data in the database originates with at least one of the communications device and sensors communicatively coupled to the communications device.

12. A non-transitory processor readable medium containing a set of instructions thereon that when executed by a processor cause the processor to:
    determine a communications device has entered an emergency mode;
    when the communications device has entered the emergency mode, generate a keyword associated with a virtual assistant associated with the communications device, wherein the keyword is not generated until an emergency has occurred;
    broadcast the keyword on a talkgroup associated with the communications device, the talkgroup including a plurality of communications devices, wherein each of the plurality of communications devices is associated with a talkgroup member, wherein the keyword may be used by members of the talkgroup to access the virtual assistant associated with the communications device
    receive, from at least one talkgroup member, via the talkgroup, a virtual assistant query directed to the virtual assistant associated with the communications device, the virtual assistant query including the keyword;

retrieve data responsive to the virtual assistant query from at least one sensor communicatively coupled to the communications device; and provide a response to the virtual assistant query on the talkgroup.

13. The medium of claim 12 further comprising instructions to:

detect the keyword using natural language processing on the communications device.

14. The medium of claim 12 wherein the instructions to provide the response to the virtual assistant query further comprises instructions to:

retrieve data responsive to the virtual assistant query from the communications device.

* * * * *